March 5, 1957 R. D. MOORE 2,783,578
FISHING LURE
Filed March 31, 1954
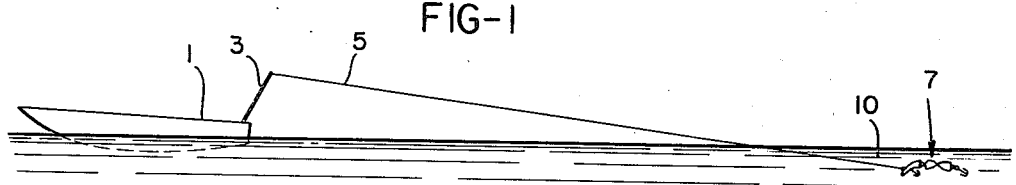
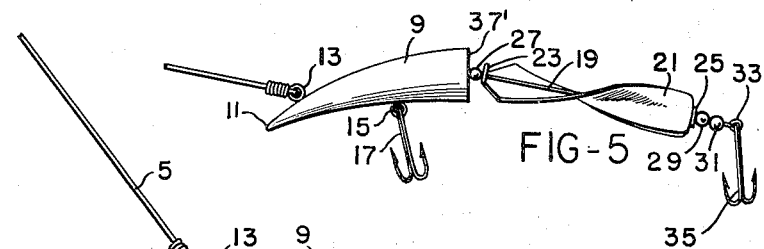
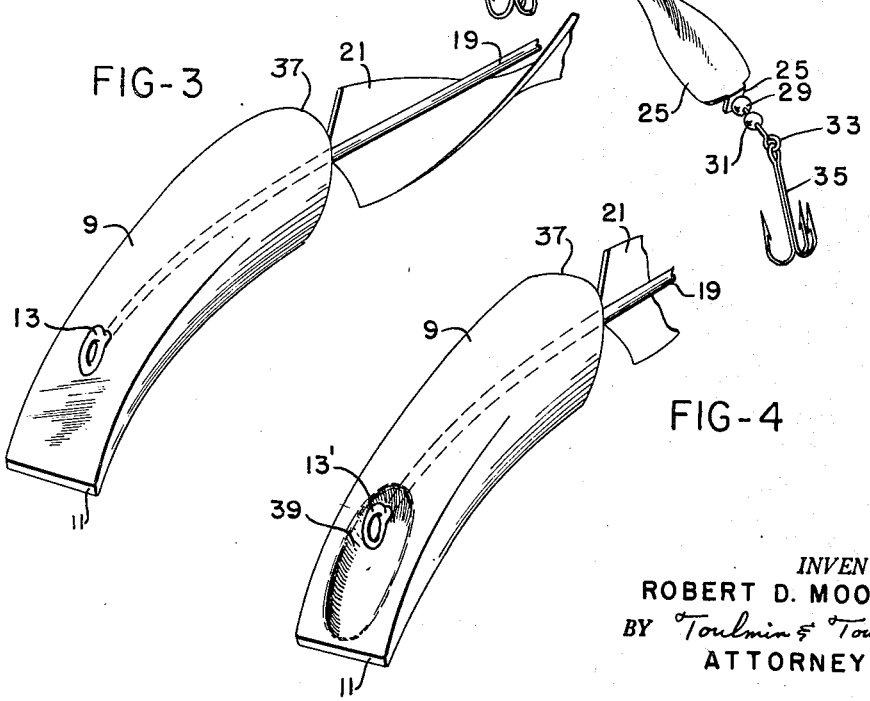
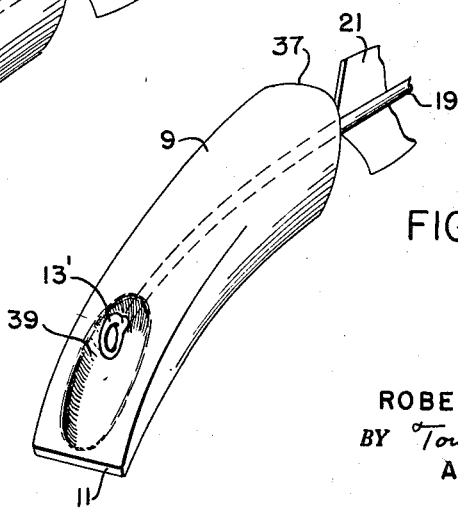
INVENTOR.
ROBERT D. MOORE
BY Toulmin & Toulmin
ATTORNEYS

United States Patent Office 2,783,578
Patented Mar. 5, 1957

2,783,578

FISHING LURE

Robert D. Moore, Springfield, Ohio

Application March 31, 1954, Serial No. 420,035

1 Claim. (Cl. 43—42.16)

My present invention relates to a novel fishing lure and has for its principal object the provision of an artificial bait which in use very closely simulates the appearance of a live minnow.

The invention particularly contemplates an artificial bait having a supporting body portion which is so formed as to swing the bait from side to side when drawn through the water; in conjunction with this supporting body I provide a rotatable member so constructed and arranged with respect to the body portion that the bait when employed creates the appearance of a swimming minnow, for example.

The assembly is such that the bait is, in use, substantially continuous in contour, having no prominent projecting elements which would detract from the appearance thereof as a live minnow.

The supporting body being constructed to swing from side to side when drawn through the water provides the structure with one of the basic characteristics of the minnow, which is well known for darting somewhat haphazardly as it moves through the water. Such by itself however is insufficient to effect complete resemblance to the minnow, another characteristic of which is the wiggling movement of the rear portion of the body to attain the darting motion. The rotatable member of my novel structure secured rearwardly of the supporting body attains this latter effect and the combination results in a life-like appearance.

It is to be noted that while other devices have been presented to the field which are designed to simulate live minnows, none so far as is known provide the features of a bait which swings from side to side and simultaneously provides motion to the assembly in such manner that the bait in use appears as a substantially continuous structure. In many of the available devices rotatable spinners are employed which extend materially outwardly of the supporting body and are of sufficient size to provide a great flash of light which appears to attract the fish. Other devices actually resemble a fish in contour, and spin, but have no means to effect a vigorous swinging movement to simulate the darting of the minnow.

The invention will be more fully understood by reference to the following detailed description and accompanying drawings wherein:

Figure 1 is a schematic view illustrating the artificial bait of invention in use;

Figure 2 is a perspective view of the structure of the invention;

Figure 3 is an enlarged perspective view of a portion of the structure of Figure 2;

Figure 4 is a view similar to that of Figure 3 particularly illustrating a further embodiment of the supporting body; and Figure 5 is a side elevational view of a structure similar to that of Figure 2.

Referring to the drawings, and particularly to Figures 1 and 2, there is shown at 1 a body having a support 3 and a fishing line 5 the outboard end of which is provided with an artificial bait indicated generally at 7, the bait being more clearly seen in Figure 2. The bait has a supporting body 9 preferably of wood or plastic and so formed that when the same is drawn slowly forwardly through the water the bait swings from side to side simulating to some degree the movements of the minnow; further when so drawn forwardly the bait seeks a level below the surface of the water 10 as is shown in Figure 1.

The body 9 is convex in side elevation and tapers smoothly downwardly in thickness to the forward end 11 which end is provided with an eyelet 13 for the securing of the line 5 to the bait. The upper and lower surfaces of the supporting body are each in the form of smooth curves, the curvature of the upper surface being more prominent. The body when drawn through the water takes substantially the position of Figure 1 with the nose 11 pointed slightly downward.

Secured to the body at the lower surface thereof, for example, an eyelet 15 the remote end of which (not shown) has a screw threaded into the body, is a hook construction 17, the nature of which may be varied if desired.

Securely affixed to the supporting body and extending from the aft end thereof, downwardly and rearwardly, in opposed relation to the supporting body and end 11, is a shaft 19 upon which is mounted for rotation vane 21 of spiral shape. Vane 21 has integral turned ends 23, 25 which are pierced to receive the shaft 19 therethrough. The shaft itself is of small diameter wire and is secured to the body in any suitable manner; for example it is suitably formed integral with the metal which defines the eyelet 13 by slightly bending the wire if necessary as shown in Figures 2 and 3.

Balls 27, 29, 31 on the shaft 19 space the ends 23, 25 from the stationary members and the balls function as bearings to permit free rotation of the vane 21 when the bait is drawn through the water. Ball 31 abuts against the eyelet 33 formed integral with shaft 19 and the eyelet supports the hook assembly 35 which may take various forms as desired.

The face 37 from which the shaft 19 extends is oval or nearly circular and preferably tapers downwardly and forwardly as shown in Figures 2–4, inclusive, to facilitate positioning of shaft 19 at a suitable angle; but the surface may also be substantially vertical if so desired as shown at 37' in Figure 5. Also as shown in Figure 4 the forward portion of the supporting body may be recessed at 39 to accommodate the eyelet 13'.

The vane 21 itself extends longitudinally of the shaft and in practice is usually about as long as the supporting body 9 and may suitably be slightly shorter, or slightly longer as shown in the drawings. Preferably the lower end of the rear of the vane which is adjacent the ball 29 is so positioned with respect to the forward end 11 of the body that they are at substantially the same vertical distance below the juncture of shaft 19 with body 9 as shown in Figure 5. Under this condition, when the bait is drawn through the water, the end 11 tips down forwardly and the shaft is very nearly parallel to the line effecting the drawing as noted more particularly hereinafter.

The vane 21 is rotated by water passing the same and simulates the rearward, somewhat wiggling portion of the body of a minnow as it swims, and for this purpose the cross section of the vane should be not substantially greater than the largest transverse cross section of the supporting body 1, as face 37. More specifically, in its rotation the outer periphery of the vane preferably extends to but not materially beyond the outer periphery of the supporting body. Such arrangement gives the impression when the vane is rotating of a completely continuous minnow body and this overall bait configuration has been found to be most effective due to the life-like appearance created.

In this connection it is to be noted that while the vane may be colored or silvered the attraction of the fish to the same is not dependent upon this feature, but the effectiveness is derived from the life-like characteristics imparted to the bait by the combination of the supporting body which occasions the swinging motion and the vane structure described.

With respect to the simulation of a live minnow it is preferable for optimum results that the shaft on which the vane rotates lie at an angle such that as the fishing line draws the bait through the water the line and shaft are substantially parallel and spaced closely together in their parallelism such that when a fishing line, long relative to the supporting body is considered the shaft is very nearly an extension of the fishing line itself. Under this condition the supporting body and the shaft-vane combination form a substantially continuous structure and simulation of a live minnow is complete. Such condition in practice is readily attained with the structure of invention and is illustrated in the drawings. However, it is to be noted that the wire of shaft 19, which may be of steel or brass for example, may be readily distorted within the minor limits necessary to attain this preferred angle.

It will be understood that this invention is susceptible to modification in order to adopt it to different usages and conditions and accordingly, it is desired to comprehend such modifications within this invention as may fall within the scope of the appended claim.

I claim:

A fishing lure designed to swing from side to side and dip below water level when drawn forwardly, comprising a supporting body of arcuate configuration having a rear portion which is substantially circular in cross-section, said body being tapered toward its front end along the upper and lower surfaces thereof, the said upper surface being convex and the said lower surface being concave, the upper surface being curved along a shorter radius than the lower surface, means for attaching a fishing line to the top front surface of the lure body, a shaft fixedly connected to the center portion of the rear end of the lure body, said shaft being directed downwardly with respect to an axis extending through the approximate center of the front half of the top surface of the lure and the center of the rear of the lure body, and a spiral vane rotatably mounted on said shaft, said vane being of a width substantially equal to that of the rear diameter of the lure body and fish hooks depending from the lure body and from the rear portion of the shaft.

References Cited in the file of this patent

UNITED STATES PATENTS

| | | |
|---|---|---|
| D. 162,696 | Stauffer | Mar. 27, 1951 |
| 1,477,756 | Heddon et al. | Dec. 18, 1923 |
| 2,159,230 | Sage | May 23, 1939 |
| 2,435,993 | Zink | Feb. 17, 1948 |
| 2,507,098 | Fischler | May 9, 1950 |
| 2,598,965 | Bain | June 3, 1952 |
| 2,662,330 | Ogburn | Dec. 15, 1953 |